(12) United States Patent
Mori (10) Patent No.: US 12,294,658 B2
(45) Date of Patent: May 6, 2025

(54) FUNCTION EXECUTING DEVICE, SERVER, AND COMMUNICATION SYSTEM

(71) Applicant: BROTHER KOGYO KABUSHIKI KAISHA, Nagoya (JP)

(72) Inventor: Kyohei Mori, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 116 days.

(21) Appl. No.: 17/806,554

(22) Filed: Jun. 13, 2022

(65) Prior Publication Data
US 2022/0400014 A1    Dec. 15, 2022

(30) Foreign Application Priority Data

Jun. 14, 2021    (JP) ................................ 2021-098961

(51) Int. Cl.
  *H04L 9/32* (2006.01)
  *G06F 21/60* (2013.01)
  *H04L 9/30* (2006.01)

(52) U.S. Cl.
  CPC .......... *H04L 9/3247* (2013.01); *G06F 21/608* (2013.01); *H04L 9/3073* (2013.01); *H04L 9/3213* (2013.01)

(58) Field of Classification Search
  CPC ... H04L 9/3247; H04L 9/3213; G06F 21/608; G06F 3/1222; G06F 3/1238
  See application file for complete search history.

(56) References Cited

U.S. PATENT DOCUMENTS

2015/0015909 A1*  1/2015  Kaida ................... G06F 21/608
                                                             358/1.14
2018/0341759 A1  11/2018  Sato
(Continued)

FOREIGN PATENT DOCUMENTS

JP    2015-035208 A    2/2015
JP    2018-198400 A    12/2018
JP    2019-086937 A    6/2019

OTHER PUBLICATIONS

Extended European Search Report dated Oct. 17, 2022 from related EP 22 173 735.6.
(Continued)

*Primary Examiner* — Nelson S. Giddins
(74) *Attorney, Agent, or Firm* — Scully, Scott, Murphy & Presser, PC (57) ABSTRACT

A function executing device may cause a first output unit to output first output information including location information of a server that is configured to operate according to a predetermined authentication scheme. The first output information may be acquired by a terminal device configured to operate according to the predetermined authentication scheme. The terminal device may be configured to access the server, receive first verification information, create signature information by encrypting the first verification information using a private key in a case where first authentication for a target user succeeds, and send the signature information to the server. The server may be configured to decrypt the signature information using a public key, and send an execution instruction to the function executing device in a case where the first verification information is acquired by decrypting the signature information. The function executing device may execute a specific function.

13 Claims, 5 Drawing Sheets

(56) References Cited

U.S. PATENT DOCUMENTS

2019/0141214 A1   5/2019  Matsumoto
2020/0195637 A1*  6/2020  Sato .................... H04W 12/069

OTHER PUBLICATIONS

European Office Action dated Jun. 26, 2024 received in a corresponding foreign application, namely European Application No. EP 22 173 735.6, 6 pages.

* cited by examiner

User Table38

| User ID | Restriction Information | | | FIDO Information | Job ID |
|---|---|---|---|---|---|
| | Print | Scan | Copy | | |
| U1 | OK | OK | OK | Registered | job1 |
| ... | ... | ... | ... | ... | ... |

Authentication Table 338

| User ID | Public Key |
|---|---|
| U1 | PK1 |
| ... | ... |
| ... | ... |

FIG. 4

(Print Process)

FUNCTION EXECUTING DEVICE, SERVER, AND COMMUNICATION SYSTEM

REFERENCE TO RELATED APPLICATION

This application claims priority to Japanese Patent Application No. 2021-098961, filed on Jun. 14, 2021, the entire contents of which are hereby incorporated by reference into the present application.

BACKGROUND ART

A system including an image processing device, an external authentication device, and a service providing system is known. When accepting an operation for using a print service, the image processing device sends a service provision request to the service providing system, receives from the service providing system a signal that requests biometric authentication to be executed and includes Assertion Challenge, and sends an assertion create request including Assertion Challenge to the external authentication device. In a case where the biometric authentication succeeds, the external authentication device creates signature data by encrypting Assertion Challenge using a private key. Then, the external authentication device sends assertion information including the signature data to the image processing device, and the image processing device sends an assertion verification request including the assertion information to the service providing system. The service providing system decrypts the signature data included in the assertion information by using a public key, determines that user authentication succeeds if the decrypted value matches Assertion Challenge, and sends a signal for providing the print service to the image processing device.

DESCRIPTION

The disclosure herein provides a novel technology that causes a function executing device to execute a specific function according to a predetermined authentication scheme using a pair of keys.

A function executing device disclosed herein may comprise: a first output unit and a controller. The controller may be configured to: in a case where a specific instruction for causing the function executing device to execute a specific function is accepted from a target user, cause the first output unit to output first output information including location information of a server that is configured to operate according to a predetermined authentication scheme using a pair of keys, wherein the first output information is acquired by a terminal device configured to operate according to the predetermined authentication scheme, the terminal device is configured to: in a case where the first output information is acquired, receive first verification information from the server in response to accessing the server using the location information included in the first output information; in a case where first authentication for the target user executed by the terminal device succeeds, create signature information by encrypting the first verification information using a private key of the pair of keys; and send the signature information to the server, the server is configured to: in a case where the signature information is received from the terminal device, decrypt the signature information using a public key of the pair of the keys; and in a case where the first verification information is acquired by decrypting the signature information, send an execution instruction for the specific function to the function executing device; and in a case where the execution instruction is received from the server after the first output information has been outputted, execute the specific function.

According to the configuration above, the function executing device causes the first output unit to output the first output information in the case where it accepts the specific instruction from the target user. In the case where the terminal device acquires the first output information, it receives the first verification information from the server in response to accessing the server using the location information. In the case where the first authentication for the target user succeeds, the terminal device creates the signature information by encrypting the first verification information by the private key and sends the created signature information to the server. In the case where the server receives the signature information form the terminal device, it decrypts the signature information by the public key. In the case where the first verification information is acquired by the decryption of the signature information, the server sends the execution instruction to the function executing device. In the case where the function executing device receives the execution instruction from the server after having outputted the first output information, it executes the specific function. Thus, it is possible to cause the function executing device to execute the specific function according to the predetermined authentication scheme using the pair of keys.

Further, a server disclosed herein may be configured to operate according to a predetermined authentication scheme using a pair of keys. The server may comprise: a controller configured to: in a case where first output information outputted from a function executing device is acquired by a terminal device and the terminal device accesses the server using location information of the server included in the first output information, send first verification information to the terminal device, wherein the function executing device is configured to, in a case where a specific instruction for causing the function executing device to execute a specific function is accepted from a target user, output the first output information, and the terminal device is configured to: in a case where first authentication for the target user executed by the terminal device succeeds after the first verification information has been received from the server, create signature information by encrypting the first verification information using a private key of the pair of keys; and send the signature information to the server; receive the signature information from the terminal device; in a case where the signature information is received from the terminal device, decrypt the signature information using a public key of the pair of the keys; and in a case where the first verification information is acquired by decrypting the signature information, send an execution instruction for the specific function to the function executing device, wherein the function executing device is configured to, in a case where the execution instruction is received from the server, execute the specific function.

According to the configuration above, the server sends the first verification information to the terminal device in the case where the first output information outputted from the function executing device is acquired by the terminal device, and the terminal device, which acquired the first output information, accesses the server using the location information. In the case where the first authentication for the target user succeeds, the terminal device creates the signature information by encrypting the first verification information by the private key and sends the created signature information to the server. In the case where the server receives the signature information from the terminal device, it decrypts the signature information using the public key. In the case where the first verification information is acquired by the decryption of the signature information, the server sends the execution instruction to the function executing device. In the case where the function executing device receives the execution instruction from the server, it executes the specific function. Thus, it is possible to cause the function executing device to execute the specific function according to the predetermined authentication scheme using the pair of keys.

Further, a communication system disclosed herein may comprise a function executing device and a server configured to operate according to a predetermined authentication scheme using a pair of keys. The function executing device may comprise: a first output unit; and a controller configured to, in a case where a specific instruction for causing the function executing device to execute a specific function is accepted from a target user, cause the first output unit to output first output information including location information of the server, wherein the first output information is acquired by a terminal device configured to operate according to the predetermined authentication scheme. The server may comprise a controller configured to, in a case where the terminal device accesses the server using the location information included in the first output information, send first verification information to the terminal device, wherein the terminal device is configured to: in a case where first authentication for the target user executed by the terminal device succeeds after the first verification information has been received from the server, create signature information by encrypting the first verification information using a private key of the pair of keys; and send the signature information to the server, receive the signature information from the terminal device; in a case where the signature information is received from the terminal device, decrypt the signature information using a public key of the pair of the keys; and in a case where the first verification information is acquired by decrypting the signature information, send an execution instruction for the specific function to the function executing device. The controller of the function executing device may be further configured to, in a case where the execution instruction is received from the server after the first output information has been outputted, execute the specific function.

According to the configuration above, the function executing device causes the first output unit to output the first output information in the case where it accepts the specific instruction from the target user. In the case where the terminal device acquires the first output information, it receives the first verification information from the server in response to accessing the server using the location information. In the case where the first authentication for the target user succeeds, the terminal device creates the signature information by encrypting the first verification information by the private key and sends the created signature information to the server. In the case where the server receives the signature information from the terminal device, it decrypts the signature information by the public key. In the case where the first verification information is acquired by the decryption of the signature information, the server sends the execution instruction to the function executing device. The function executing device executes the specific function in the case where it receives the execution instruction from the server. Thus, it is possible to cause the function executing device to execute the specific function according to the predetermined authentication scheme using the pair of keys.

A control method of the function executing device above, a computer program for the function executing device above, and a storage medium storing the computer program are also novel and useful. Further, a control method of the server above, a computer program for the server above, and a storage medium storing the computer program are also novel and useful.

FIRST EMBODIMENT

Figure 1:
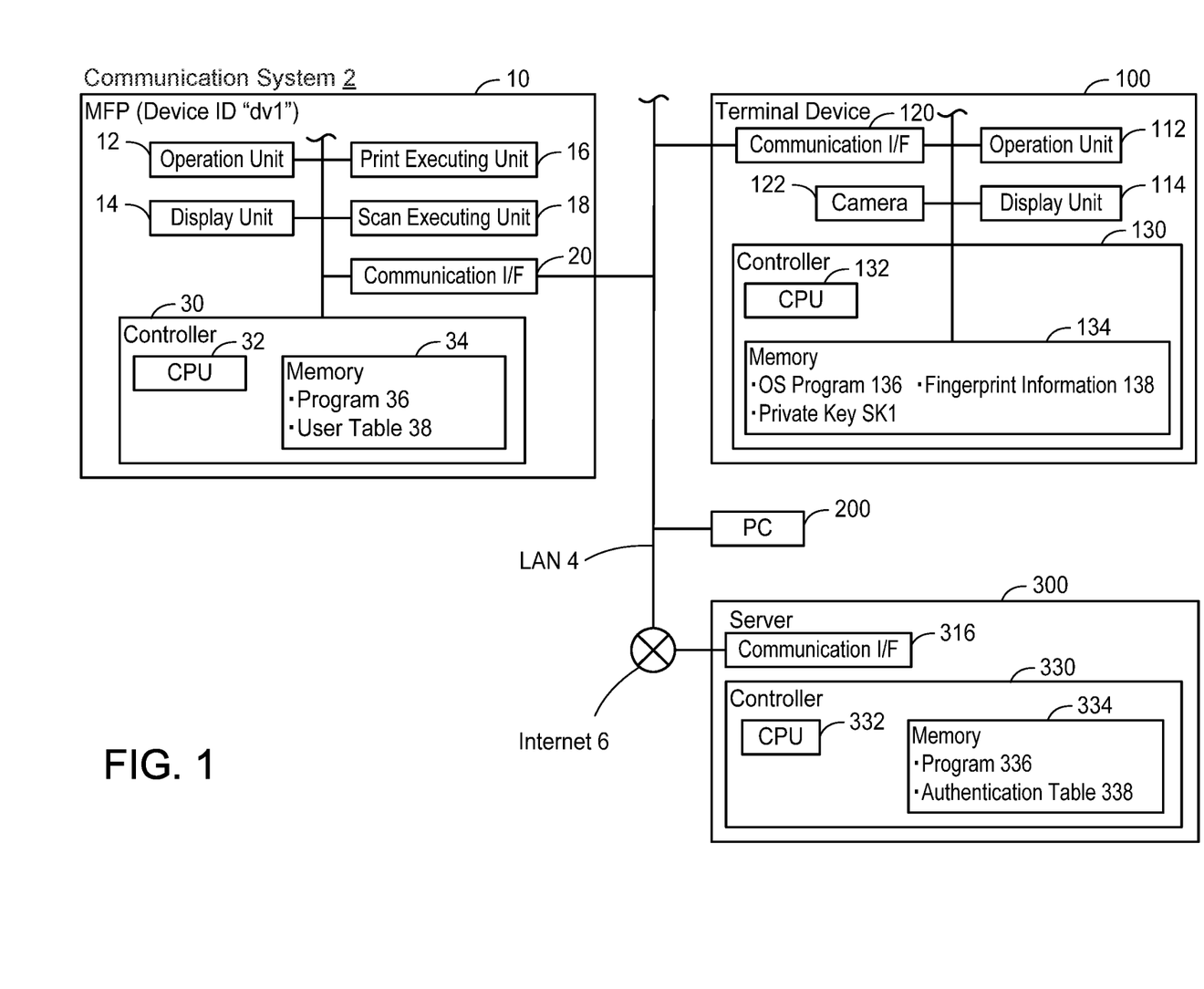
FIG. 1 illustrates a configuration of a communication system.

Configuration of Communication System 2; FIG. 1

As illustrated in FIG. 1, a communication system 2 comprises an MFP (multifunction peripheral) 10, a terminal device 100, a PC 200, and a server 300. The MFP 10, the terminal device 100, and the PC 200 belong to the same LAN (local area network) 4 and are communicable with each other via the LAN 4. The LAN 4 is connected to the Internet 6. The server 300 is connected to the Internet 6. The MFP 10, the terminal device 100, the PC 200, and the server 300 are communicable with each other via the Internet 6. In the present embodiment, the terminal device 100 and the PC 200 are used by the same user.

Configuration of MFP 10

The MFP 10 is a peripheral device (e.g., a peripheral device of the terminal device 100) configured to execute a print function, a scan function, a copy function, a web server function, etc. The web server function is a function of sending webpage data representing a webpage to an external device in response to the external device accessing a web server in the MFP 10. A device ID "dv1" for identifying the MFP 10 is assigned to the MFP 10.

The MFP 10 comprises an operation unit 12, a display unit 14, a print executing unit 16, a scan executing unit 18, a communication interface 20, and a controller 30. Hereinafter, an interface will be simply denoted as "I/F".

The operation unit 12 comprises a plurality of keys. The user can input various instructions to the MFP 10 by operating the operation unit 12. The display unit 14 is a display for displaying various information. The display unit 14 may function as a touch screen (i.e., the operation unit 12).

The print executing unit 16 comprises a print mechanism of inkjet scheme, laser scheme, or the like. The scan executing unit 18 comprises a scan mechanism of CCD (charge coupled device) image sensor, CIS (contact image sensor), or the like. The communication I/F 20 is connected to the LAN 4. The communication I/F 20 may be a wireless I/F or a wired I/F.

The controller 30 comprises a CPU 32 and a memory 34. The CPU 32 is configured to execute various processes in accordance with a program 36 stored in the memory 34. The memory 34 is configured of a volatile memory, a non-volatile memory, etc. The memory 34 further stores a user table 38.

Configuration of Terminal Device 100

The terminal device 100 is a portable terminal device such as a mobile phone (e.g., a smartphone), a PDA, a tablet PC, or the like. The terminal device 100 comprises an operation unit 112, a display unit 114, a communication I/F 120, a camera 122, and a controller 130.

The operation unit 112 is, for example, a touch screen. The operation unit 112 is configured to accept various instructions. The operation unit 112 also functions as a fingerprint authentication unit. The display unit 114 is a display for displaying various information. The communication I/F 120 is connected to the LAN 4. The camera 122 is a device configured to capture objects. In the present embodiment, the camera 122 is used to capture a QR Code (registered trademark) displayed on the display unit 14 of the MFP 10. "QR Code" is a registered trademark of DENSO WAVE INCORPORATED.

The controller 130 comprises a CPU 132 and a memory 134. The CPU 132 is configured to execute various processes in accordance with an OS (operating system) program 136 stored in the memory 134. The terminal device 100 is configured to operate in accordance with a FIDO (fast identity online) authentication scheme using a pair of keys. The FIDO authentication scheme is an authentication scheme using a pair of keys, namely a private key and a public key. Further, the FIDO authentication scheme is an authentication scheme that executes user authentication by biometric authentication (e.g., fingerprint authentication, voice authentication, face authentication), instead of by use of a password. In the present embodiment, the terminal device 100 operates as an authentication device according to the FIDO authentication scheme. The memory 134 is configured of a volatile memory, a non-volatile memory, etc. The memory 134 further stores fingerprint information 138 and a private key SK1. The fingerprint information 138 is information on fingerprints of the user of the terminal device 100. The private key SK1 is used in authentication according to the FIDO authentication scheme (simply termed "FIDO authentication", hereinafter).

Configuration of Server 300

The server 300 is installed on the Internet and is provided by, for example, a vendor of the MFP 10. In a variant, the server 300 may be provided by a vender different from the vender of the MFP 10. The server 300 is configured to operate in accordance with the FIDO authentication scheme. In the present embodiment, the server 300 operates as an authentication server in the FIDO authentication. The server 300 is configured to send the MFP 10 an instruction for causing the MFP 10 to execute its function (e.g., print function) in response to user authentication according to the FIDO authentication scheme succeeding.

The server 300 comprises a communication I/F 316 and a controller 330. The communication I/F 316 is connected to the Internet 6. The controller 330 comprises a CPU 332 and a memory 334. The CPU 332 is configured to execute various processes in accordance with a program 336 stored in the memory 334. The memory 334 further stores an authentication table 338.

Figure 2:
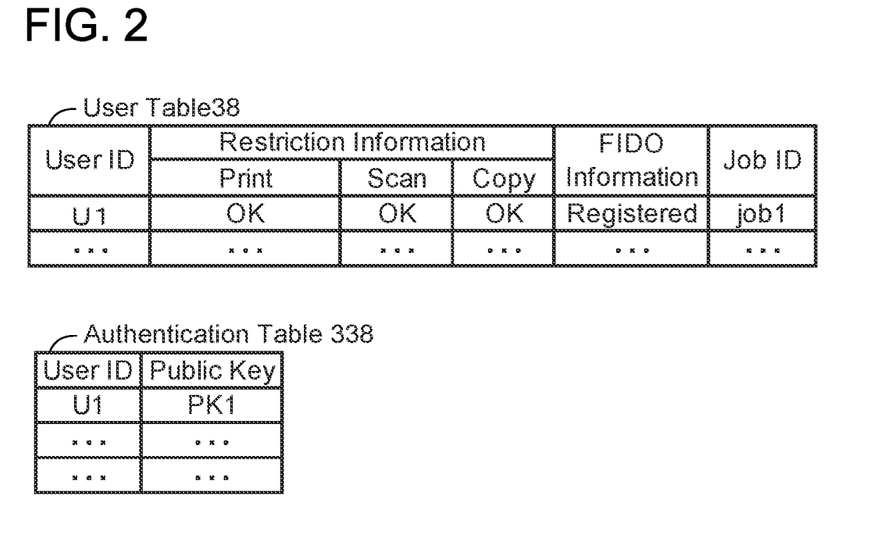
FIG. 2 illustrates examples of tables.

Contents of User Table 38, Authentication Table 338; FIG. 2)

Next, referring to FIG. 2, the user table 38 of the MFP 10 and the authentication table 338 of the server 300 will be described.

The user table 38 of the MFP 10 stores, for each of one or more users of the MFP 10, a user ID, restriction information, a job ID, and FIDO information in association with each other. The restriction information is information for specifying one or more functions each user is permitted to use among the print function, the scan function, and the copy function the MFP 10 is capable of executing. "OK" indicates that the user is permitted to use the function(s), and "NG" indicates that the user is not permitted to use the function(s). The FIDO information indicates whether a registration process in which a pair of keys used in the FIDO authentication is registered has been completed or not. "Registered" indicates that the registration process has been completed, and "Unregistered" indicates that the registration process has not been completed yet. The job ID is information for identifying print data. Print data is associated with each job ID, although this is not illustrated.

The authentication table 338 of the server 300 stores user ID(s) and public key(s) in association with each other. The public key(s) is used in the FIDO authentication. The public key(s) is registered in the authentication table 338 in the registration process, which will be described later.

Figure 3:
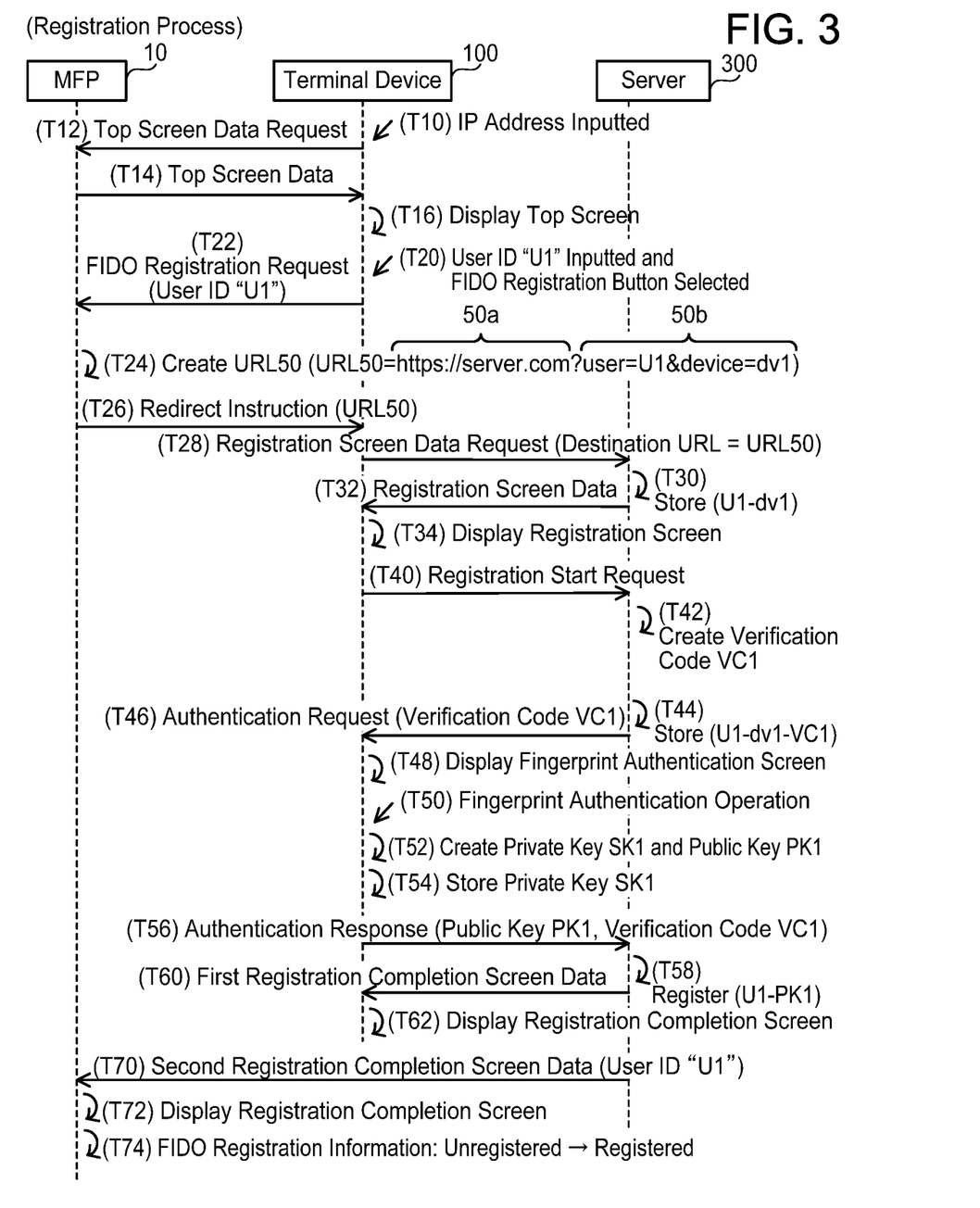
FIG. 3 illustrates a sequence diagram of a registration process.

Registration Process; FIG. 3

Referring to FIG. 3, the registration process will be described. In the registration process, information for the FIDO authentication is registered in the respective devices. The following description will be given with each device (e.g., the MFP 10) as the subject of action rather than the CPU of each device (e.g., the CPU 32 of the MFP 10) as the subject of action. Communication executed by each device is executed via the communication I/F of the device (e.g., the communication I/F 20 of the MFP 10), and thus hereinafter, the phrase "via the communication I/F" will be omitted in descriptions on steps involving communication via the communication I/F.

In an initial state of FIG. 3, a user ID "U1", print "OK", scan "OK", copy "NG", and FIDO information "Unregistered" are stored in association with each other in the user table 38 of the MFP 10. Further, the fingerprint information 138 is stored in the memory 134 of the terminal device 100. Further, the authentication table 338 of the server 300 is empty.

When the terminal device 100 accepts input of an IP address assigned to the MFP 10 in T10, it sends a top screen data request to the MFP 10 in T12, receives top screen data from the MFP 10 in T14, and displays a top screen on the display unit 114 in T16. Displayed on the top screen are an entry field for a user ID, a FIDO registration button for registering information for the FIDO authentication, etc. When accepting input of the user ID "U1" and selection of the FIDO registration button (i.e., a registration instruction) in T20, the terminal device 100 sends a FIDO registration request including the user ID "U1" to the MFP 10 in T22.

When receiving the FIDO registration request from the terminal device 100 in T22, the MFP 10 creates a URL (uniform resource locator) 50 in T24. The MFP 10 first specifies a URL 50a (i.e., "https://server.com") stored in the memory 34 in advance. The URL 50a is a URL for accessing the server 300. The MFP 10 then adds a query character string 50b to the URL 50a to create the URL 50. The query character string 50b includes the user ID "U1" included in the received FIDO registration request and the device ID "dv1" of the MFP 10 (i.e., "user=U1&device=dv1"). Then, the MFP 10 sends a redirect instruction including the created URL 50 to the terminal device 100 in T26. The redirect instruction is an instruction for causing the terminal device 100 to access the server 300 using the URL 50 in the redirect instruction as a destination URL.

When receiving the redirect instruction from the MFP 10 in T26, the terminal device 100 sends the server 300 a registration screen data request including the URL 50 in the redirect instruction as a destination URL in T28. Since the redirect instruction including the URL 50 is sent from the MFP 10 to the terminal device 100, the user of the terminal device 100 does not need to perform an operation for accessing the server 300. Thus, user convenience can be improved.

When receiving the registration screen data request from the terminal device 100 in T28, the server 300 extracts a character string before the mark "?" in the URL 50 included in the registration screen data request as the URL 50a and extracts a character string after the mark "?" as the query character string 50b. The server 300 further extracts the user ID "U1" and the device ID "dv1" from the query character string 50b. The server 300 stores the extracted user ID "U1" and device ID "dv1" in association with each other in the memory 334 in T30. Then, the server 300 sends registration screen data to the terminal device 100 in T32.

When receiving the registration screen data from the server 300 in T32, the terminal device 100 displays a registration screen in T34. The registration screen is a screen for informing the user that the registration process is being executed. Then, in T40, the terminal device 100 sends the server 300 a registration start request that requests registration of a pair of keys to be used in the FIDO authentication.

When receiving the registration start request from the terminal device 100 in T40, the server 300 creates a verification code VC1, which is a unique character string, in T42, and stores the created verification code VC1 in association with the user ID "U1" and the device ID "dv1" in the memory 334 in T44. The server 300 then sends an authentication request including the created verification code VC1 to the terminal device 100 in T46.

When receiving the authentication request from the server 300 in T46, the terminal device 100 displays a fingerprint authentication screen in T48. The fingerprint authentication screen displays a message requesting fingerprint authentication. The terminal device 100 accepts a fingerprint authentication operation in T50. In the present case, fingerprint information acquired from the fingerprint authentication operation matches the fingerprint information 138 in the memory 134, and thus the terminal device 100 determines that the fingerprint authentication succeeds. Then, the terminal device 100 creates a private key SK1 and a public key PK1 to be used in the FIDO authentication in T52 and stores the private key SK1 in the memory 134 in T54. The terminal device 100 then sends an authentication response including the created public key PK1 and the received verification code VC1 to the server 300 in T56.

When receiving the authentication response from the terminal device 100 in T56, the server 300 specifies the verification code VC1 in the request and specifies the user ID "U1" associated with the specified verification code VC1 in the memory 334. The server 300 determines that the specified verification code VC1 matches the verification code VC1 associated with the specified user ID "U1" in the authentication table 338 (see T44) and thus determines that user authentication for the user ID "U1" has succeeded. In this case, the server 300 registers the public key PK1 in the received authentication response and the specified user ID "U1" in association with each other in the authentication table 338 in the memory 334 in T58. Then, the server 300 sends first registration completion screen data to the terminal device 100 in T60. Further, the server 300 specifies the device ID "dv1" associated with the verification code VC1 in the memory 334 and sends second registration completion screen data including the user ID "U1" to the MFP 10 in T70. The server 300 also deletes the device ID "dv1" and the verification code VC1 stored in the memory 334. As described, the MFP 10 sends the URL 50 including the device ID "dv1" to the terminal device 100 via the communication I/F 20 (T24, T26 in FIG. 3) and the server 300 receives the registration screen data request including the device ID "dv1" from the terminal device 100 (T28). Thus, even if a plurality of MFPs exists, the server 300 can properly determine the MFP to which the second registration completion screen data is to be sent by using the device ID "dv1" received from the terminal device 100.

When receiving the first registration completion screen data from the server 300 in T60, the terminal device 100 displays on the display unit 114 a first registration completion screen that includes a message indicating that the registration process has been completed in T62. The user can thereby acknowledge that registration of a pair of keys to be used in the FIDO authentication has been completed.

When receiving the second registration completion screen data from the server 300 in T70, the MFP 10 displays on the display unit 14 a second registration completion screen that includes a message indicating that the registration process has been completed in T72. Then, in T74, the MFP 10 changes the FIDO information associated with the user ID "U1" included in the received second registration completion screen data from "Unregistered" to "Registered" in the user table 38. The registration process ends when step T74 is completed. Thus, the user of the terminal device 100 is now able to use the FIDO authentication.

Figure 4:
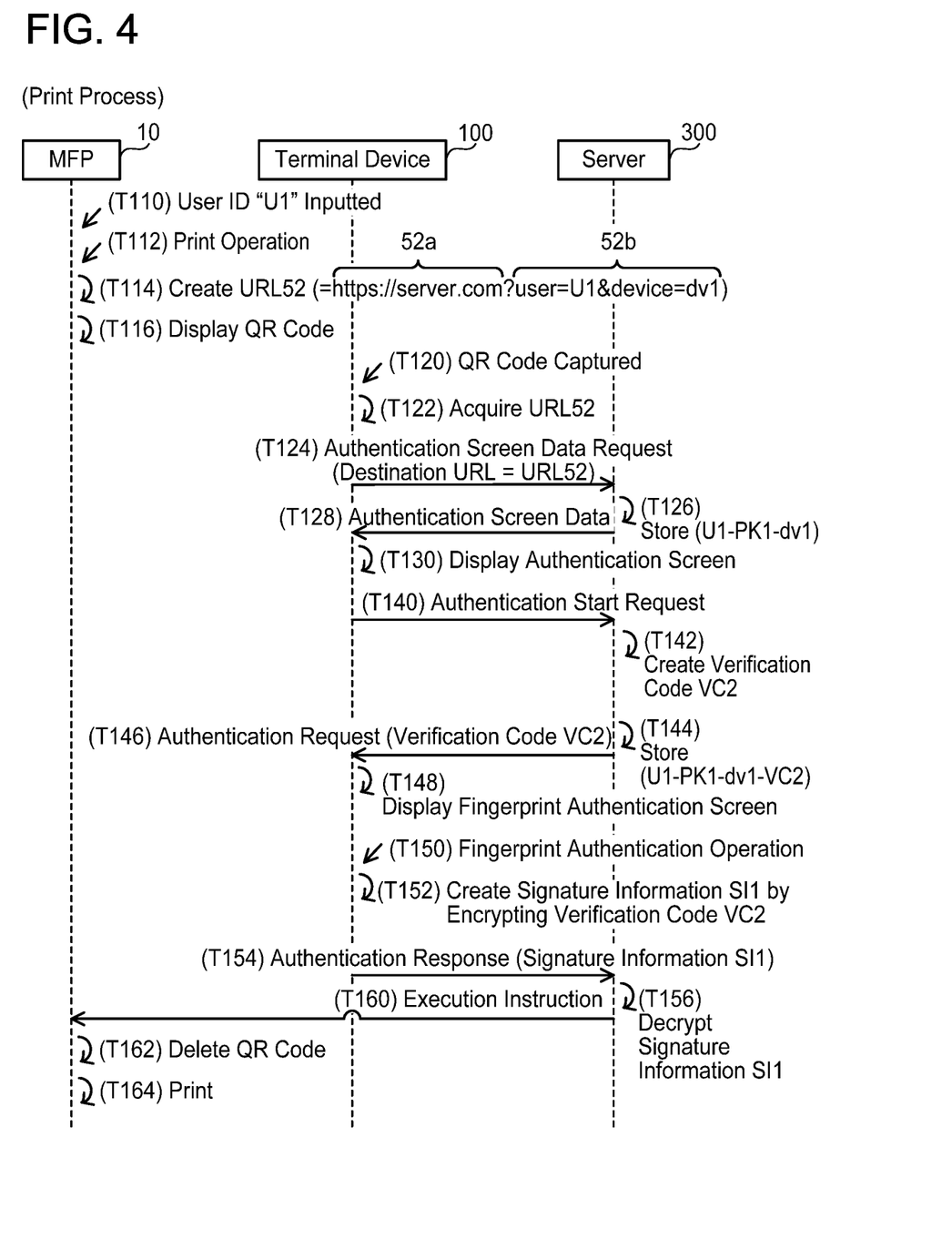
FIG. 4 illustrates a sequence diagram of a print process.

Print Process; FIG. 4

Referring to FIG. 4, a print process will be described. In the print process, printing is executed by using the MFP 10. FIG. 4 illustrates a sequence after the registration process of FIG. 3 has been completed. That is, in the user table 38 of the MFP 10, the FIDO information associated with the user ID "U1" indicates "Registered". Further, the private key SK1 is already stored in the memory 134 of the terminal device 100. Moreover, in the authentication table 338 of the server 300, the user ID "U1" and the public key PK1 are already stored in association with each other. Further, the user of the PC 200 has already sent print data to the MFP 10 using the PC 200 after the completion of the registration process of FIG. 3. Thus, a job ID "job1" corresponding to the print data received from the PC 200 is already stored in association with the user ID "U1" in the user table 38 of the MFP 10.

When the MFP 10 accepts input of the user ID "U1" in T110 and accepts a print operation (i.e., a print instruction) in T112, it determines that the FIDO information associated with the inputted user ID "U1" in the user table 38 indicates "Registered". In this case, the MFP 10 creates a URL 52 in which a query character string 52b is added to a URL 52a in T114. The URL 52a and the query character string 52b are the same as the URL 50a (see FIG. 3) and the query character string 50b (see FIG. 3), respectively. If the MFP 10 determines that the FIDO information associated with the inputted user ID "U1" in the user table 38 indicates "Unregistered", it may display on the display unit 14 a message that requests the execution of the registration process. The MFP 10 then codes the URL 52 to create a QR Code and displays the created QR Code on the display unit 14 in T116.

When the terminal device 100 accepts in T120 from the user an operation for capturing the QR Code displayed in the display unit 14 of the MFP 10 using the camera 122, it captures the QR Code displayed on the display unit 14 of the MFP 10. Then, the terminal device 100 decodes the captured QR Code to acquire the URL 52 including the URL 52a and the query character string 52b in T122 and sends the server 300 an authentication screen data request including the acquired URL 52 as a destination URL in T124. Since the QR Code, which is acquired by coding the URL 52 including the URL 52a and the query character string 52b, is displayed on the display unit 14 of the MFP 10, the user of the terminal device 100 does not need to perform an operation of inputting the URL 52a, the user ID "U1", and the device ID "dv1". Thus, user convenience can be improved.

When receiving the authentication screen data request from the terminal device 100 in T124, the server 300 extracts a character string before the mark "?" in the URL 52 as the URL 52a and extracts a character string after the mark "?" as the query character string 52b. The server 300 further extracts the user ID "U1" and the device ID "dv1" from the query character string 52b. The server 300 determines that the user ID "U1" that matches the extracted user ID "U1" is in the authentication table 338. In this case, the server 300 stores the extracted device ID "dv1" in association with the user ID "U1" in the authentication table 338 in T126. As a result, the user ID "U1", the public key PK1, and the device ID "dv1" are associated with each other. The server 300 then sends authentication screen data to the terminal device 100 in T128.

When receiving the authentication screen data from the server 300 in T128, the terminal device 100 displays an authentication screen in T130. The authentication screen is a screen for informing the user that the process for execution of the FIDO authentication is being executed. Then, the terminal device 100 sends an authentication start request to the server 300 in T140.

When receiving the authentication start request from the terminal device 100 in T140, the server 300 creates a verification code VC2, which is a unique character string, in T142 and stores the created verification code VC2 in association with the user ID "U1" in the authentication table 338 in T144. As a result, the user ID "U1", the public key PK1, the device ID "dv1", and the verification code VC2 are associated with each other. Then, the server 300 sends an authentication request including the created verification code VC2 to the terminal device 100 in T146.

T148 and T150 are the same as T48 and the T50 in FIG. 3, respectively. The terminal device 100 determines that the fingerprint authentication has succeeded and then creates signature information SI1 in T152 by encrypting the received verification code VC2 by the private key SK1 stored in the memory 134. Then, the terminal device 100 sends an authentication response including the created signature information SI1 to the server 300 in T154.

When receiving the authentication response from the terminal device 100 in T154, the server 300 decrypts the signature information SI1 in the authentication response in T156 by the public key PK1 associated with the user ID "U1" in the authentication table 338. In the present embodiment, the verification code VC2 is acquired by the decryption of the signature information SI1 using the public key PK1. The server 300 determines that the decrypted signature information SI1 (i.e., the verification code VC2) matches the verification code VC2 associated with the user ID "U1" in the authentication table 338 (see T144) and thus determines that user authentication for the user ID "U1" has succeeded. In this case, the server 300 specifies the device ID "dv1" associated with the user ID "U1" in the authentication table 338 and sends an execution instruction to the MFP 10 in T160. The execution instruction is information that indicates that the user authentication for the user ID "U1" has succeeded and instructs execution of the function corresponding to the instruction the MFP 10 accepted (see T112). Further, the server 300 deletes the device ID "dv1" and the verification code VC2 associated with the user ID "U1" in the authentication table 338 after having sent the execution instruction to the MFP 10.

As described, the QR Code in which the URL 52 including the device ID "dv1" is coded is displayed on the display unit 14 of the MFP 10 (see T114, T116). The server 300 then receives the authentication screen data request including the device ID "dv1" from the terminal device 100 (T124). Thus, even if a plurality of MFPs exists, the server 300 can properly determine the MFP to which the execution instruction is to be sent by using the device ID "dv1" received from the terminal device 100. Further, as described, the QR Code in which the URL 52 including the user ID "U1" is coded is displayed on the display unit 14 of the MFP 10 (see T114, T116). The server 300 then receives the authentication screen data request including the user ID "U1" from the terminal device 100 (T124). Thus, the server 300 can properly determine the public key to be used to decrypt the signature information SI1 by using the user ID "U1" received from the terminal device 100.

When receiving the execution instruction from the server 300 in T160, the MFP 10 deletes the QR Code displayed on the display unit 14 in T162. In a variant, the MFP 10 may delete the QR Code from the display unit 14 when a predetermined time period has elapsed since the display of the QR Code started on the display unit 14. The MFP 10 then specifies the job ID "job 1" associated with the inputted user ID "U1" (see T110) in the user table 38, specifies the print data associated with the specified job ID "job1", and executes printing according to the specified print data in T164. The print process ends when step T164 is completed. Thus, the user of the terminal device 100 can cause the MFP 10 to execute the print function by using the FIDO authentication.

Effects of Present Embodiment

According to the configuration above, when the MFP 10 accepts the print instruction from the user (T112 in FIG. 4), it displays the QR Code including the URL 52a of the server 300 on the display unit 14 (T116). The terminal device 100 acquires the QR Code (T120) and receives the verification code VC2 from the server 300 (T146) in response to accessing the server 300 by using the URL 52a (T124). When the fingerprint authentication for the user succeeds, the terminal device 100 creates the signature information SI1 by encrypting the verification code VC2 by the private key SK1 and sends the created signature information SI1 to the server 300 (T154). When receiving the signature information SI1 from the terminal device 100 (T154), the server 300 decrypts the signature information SI1 by using the public key PK1 (T156). When acquiring the verification code VC2 by the decryption of the signature information SI1, the server 300 sends the execution instruction to the MFP 10 (T160). When receiving the execution instruction from the server 300 after having displayed the QR Code on the display unit 14 (T160), the MFP 10 executes the print function (T164). Thus, it is possible to cause the MFP 10 to execute the print function in accordance with the FIDO authentication scheme using the pair of keys.

In the registration process of FIG. 3, the MFP 10 sends the URL 50 including the user ID "U1" to the terminal device 100 via the communication I/F 20 (T24, T26). Then, the server 300 receives the registration screen data request including the user ID "U1" from the terminal device 100 (T28) and stores the user ID "U1" and the public key PK1 in association with each other in the authentication table 338 in the memory 334 (T58). Thus, when the server 300 receives the authentication response including the signature information SI1 from the terminal device 100 (T154) in the print process of FIG. 4, the server 300 can decrypt the signature information SI1 by using the proper public key PK1 associated with the user ID "U1" in the authentication table 338 (T156).

When the QR Code outputted by the MFP 10 is acquired by the terminal device 100 (T120 in FIG. 4) and the terminal device 100, which has acquired the QR Code, accesses the server 300 using the URL 52a (T124), the server 300 sends the verification code VC2 to the terminal device 100 (T146). When the fingerprint authentication for the user has succeeded (T150), the terminal device 100 creates the signature information SI1 by encrypting the verification code VC2 by the private key SK1 (T152) and sends the signature information SI1 to the server 300. When receiving the signature information SI1 from the terminal device 100 (T154), the server 300 decrypts the signature information SI1 by using the public key PK1 (T156). When the verification code VC2 is acquired by the decryption of the signature information SI1, the server 300 sends the execution instruction to the MFP 10 (T160). When receiving the execution instruction from the server 300, the MFP 10 executes the print function (T164). Thus, it is possible to cause the MFP 10 to execute the print function in accordance with the FIDO authentication scheme using the pair of keys.

Correspondence Relationships

The MFP 10 is an example of "function executing device". The user of the terminal device 100 is an example of "target user". The print function and the print instruction are examples of "specific function" and "specific instruction", respectively. The FIDO authentication scheme is an example of "predetermined authentication scheme". The URL 52a is an example of "location information of a server". The QR Code of T116 in FIG. 4 is an example of "first output information" and "code image". The display unit 14 is an example of "first output unit". The verification code VC2 is an example of "first verification information". The fingerprint authentication succeeding in T150 of FIG. 4 is an example of "first authentication". The device ID "dv1" is an example of "device identification information". The user ID "U1" is an example of "user identification information". The redirect instruction of T26 in FIG. 3 including the URL 50 is an example of "second output information". The communication I/F 20 is an example of "second output unit". The verification code VC1 is an example of "second verification information". The fingerprint authentication succeeding in T50 of FIG. 3 is an example of "second authentication". The second registration completion screen data of T70 in FIG. 3 is an example of "registration completion notification".

T116 and T164 in FIG. 4 are examples of "cause the first output unit to output first output information" and "execute the specific function", respectively.

T146, T154, T156, and T160 in FIG. 4 are "send first verification information", "receive the signature information", "decrypt the signature information", and "send an execution instruction", respectively.

Second Embodiment

Figure 5:
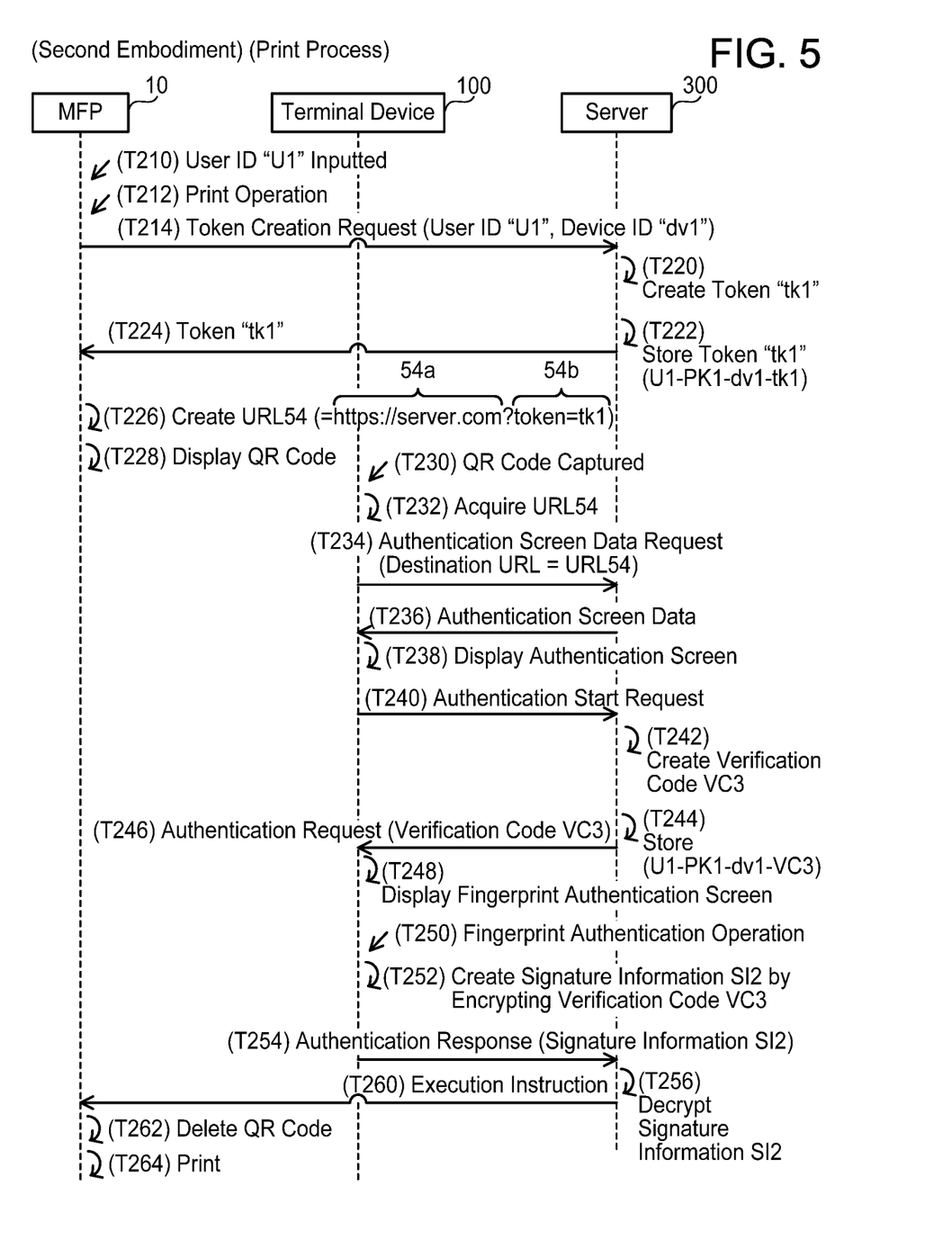
FIG. 5 illustrates a sequence diagram of a print process.

Referring to FIG. 5, a second embodiment will be described. In the second embodiment, a process executed by the MFP 10 in response to the receipt of the print instruction differs from the process executed by the MFP 10 in the first embodiment. An initial state in FIG. 5 is the same as the initial state in FIG. 4.

T210 and T212 in FIG. 5 are the same as T110 and T112 in FIG. 4, respectively. In T214, the MFP 10 sends the server 300 a token creation request including the inputted user ID "U1" and the device ID "dv1".

When receiving the token creation request from the MFP 10 in T214, the server 300 creates a unique token "tk1" in T220 and temporarily stores the device ID "dv1" and the token "tk1" in association with the user ID "U1" included in the token creation request in the authentication table 338 in T222. Then, the server 300 sends the token "tk1" to the MFP 10 in T224.

When receiving the token "tk1" from the server 300 in T224, the MFP 10 creates a URL 54 in which a query character string 54b is added to a URL 54a in T226. The URL 54a is the same as the URL 50a (see FIG. 3). The query character string 54b includes the token "tk1" (i.e., "token=tk1"). The MFP 10 then codes the URL 54 to create a QR Code and displays the created QR Code on the display unit 14 in T228.

T230 to T234 are the same as T120 to T124 in FIG. 4 except that the URL 54 is used. When receiving the authentication screen data request from the terminal device 100 in T234, the server 300 extracts a character string before the mark "?" in the URL 54 as the URL 54a and extracts a character string after the mark "?" as the query character string 54b. The server 300 further extracts the token "tk1" from the query character string 54b. The server 300 determines that the token "tk1" that matches the extracted token "tk1" is in the authentication table 338. Then, the server 300 specifies the user ID "U1", the public key PK1, and the device ID "dv1" associated with the token "tk1" in the authentication table 338 as target information to be used in the subsequent steps. Then, the server 300 deletes the token "tk1" from the authentication table 338 and sends authentication screen data to the terminal device 100 in T236. T238 and T240 are the same as T130 and T140 in FIG. 4, respectively. The server 300 creates a verification code VC3, which is a unique character string, in T242 and stores the verification code VC3 in association with the user ID "U1", the public key PK1, and the device ID "dv1" in the authentication table 338 in T244. Then, the server 300 sends an authentication request including the verification code VC3 to the terminal device 100 in T246.

T248 and T250 are the same as T148 and T150 in FIG. 4, respectively. In T252, the terminal device 100 creates signature information SI2 by encrypting the received verification code VC3 by the private key SK1 stored in the memory 134. The terminal device 100 then sends an authentication response including the created signature information SI2 to the server 300 in T254.

When receiving the authentication response from the terminal device 100 in T254, the server 300 decrypts the signature information SI2 in the authentication response by the public key PK1 specified as the target information in T256. In the present embodiment, the verification code VC3 is acquired by the decryption of the signature information SI2 by the public key PK1. The server 300 determines that the decrypted signature information SI2 (i.e., the verification code VC3) matches the verification code VC3 stored in the authentication table 338 (see T244) and determines that user authentication for the user ID "U1" specified as the target information has succeeded. In this case, the server 300 sends an execution instruction to the MFP 10 which is identified by the device ID "dv1" specified as the target information in T260. Further, the server 300 deletes the device ID "dv1" and the verification code VC3 associated with the user ID "U1" in the authentication table 338 after having sent the execution instruction to the MFP 10. T262 and T264 are the same as T162 and T164, respectively.

As described, when the MFP 10 accepts the print instruction from the user (T212 in FIG. 5), it sends the token creation request including the device ID "dv1" to the server 300 (T214). When receiving the token creation request from the MFP 10 (T214), the server 300 creates the token "tk1" (T220), stores the token "tk1" and the device ID "dv1" in association with each other (T222), and sends the token "tk1" to the MFP 10 (T224). The QR Code created by the MFP 10 is information including the URL 54 and the token "tk1" (T226). The server 300 receives the authentication screen data request including the URL 54 ad the token "tk1" from the terminal device 100 (T234). The server 300 can specify the device ID "dv1" stored in association with the token "tk1" by using the token "tk1" received from the terminal device 100. Thus, even if a plurality of MFPs exists, the server 300 can properly determine the MFP to which the execution instruction is to be sent by using the token "tk1" received from the terminal device 100.

Further, as described, when the MFP 10 accepts the print instruction from the user (T212 in FIG. 5), it sends the token creation request including the user ID "U1" to the server 300 (T214). When receiving the token creation request from the MFP 10 (T214), the server 300 creates the token "tk1" (T220), stores the token "tk1" and the user ID "U1" in association with each other (T222), and sends the token "tk1" to the MFP 10 (T224). The QR Code created by the MFP 10 is information including the URL 54 and the token "tk1" (T226). The server 300 receives the authentication screen data request including the URL 54 and the token "tk1" from the terminal device 100 (T234). The server 300 can specify the user ID "U1" stored in association with the token "tk1" and the public key PK1 stored in association with the user ID "U1" by using the token "tk1" received from the terminal device 100. Thus, the server 300 can properly determine the public key to be used to decrypt the signature information SI2 by using the token "tk1" received from the terminal device 100.

(Variant 1) The "first output unit" is not limited to the display unit 14, and may be the print executing unit 16 or the communication I/F 20. If the print executing unit 16 is an example of the "first output unit", the print executing unit 16 may print a code image (a QR Code, a barcode, etc.) or a character string representing the URL 52 (see FIG. 4). If the communication I/F 20 is an example of the "first output unit", the URL 52 may be sent to the terminal device 100. In this variant, the communication I/F 20 is an NFC I/F, a Wi-Fi I/F, or a Bluetooth (registered trademark) I/F. "Bluetooth" is a registered trademark of Bluetooth SIG, Inc.

(Variant 2) A password may be stored in the memory 134 of the terminal device 100. In the present variant, the terminal device 100 displays on the display unit 114 a screen that requests input of a password in T148 of FIG. 4.

(Variant 3) When the MFP 10 accepts an instruction for causing the MFP 10 to execute the scan function by the user operating the operation unit 12 or when the MFP 10 receives an instruction for logging into the web server in the MFP 10 from the terminal device 100 by the user operating the terminal device 100, the MFP 10 may execute the steps from T114 and onward in FIG. 4 or the steps from T214 and onward in FIG. 5.

(Variant 4) The URL 52 of T114 in FIG. 4 may not include at least one of the user ID "U1" and the device ID "dv1". In this case, the terminal device 100 may display a screen that requests input of a user ID and/or a device ID on the display unit 114 when acquiring the URL 52. In another variant, the user ID "U1" and/or the device ID "dv1" may be stored in advance in the memory 134 of the terminal device 100, and when acquiring the URL 52 that does not include at least one of the user ID "U1" and the device ID "dv1", the terminal device 100 may send the server 300 information that is not included in the URL 52, which is the user ID "U1" and/or the device ID "dv1".

(Variant 5) The token creation request of T214 in FIG. 5 may not include at least one of the user ID "U1" and the device ID "dv1". In the present variant, the user ID "U1" and/or the device ID "dv1" are stored in advance in the memory 334 of the server 300, and when receiving the token creation request, the server 300 creates the token "tk1" and stored the token "tk1" in association with the user ID "U1" and/or the device ID "dv1" stored in the memory 334.

(Variant 6) The URL 50 of T24 in FIG. 3 may not include at least one of the user ID "U1" and the device ID "dv1". In this case, the terminal device 100 may display a screen that requests input of a user ID and/or a device ID on the display unit 114 when acquiring the URL 50. In another variant, the user ID "U1" and/or the device ID "dv1" may be stored in advance in the memory 134 of the terminal device 100, and when acquiring the URL 50, the terminal device 100 may send the server 300 information that is not included in the URL 50, which is the user ID "U1" and/or the device ID "dv1".

(Variant 7) The signal that the MFP 10 sends in T26 of FIG. 3 may not be the redirect instruction. In the present variant, when receiving the URL 50 from the MFP 10, the terminal device 100 may display a screen that allows the user to select whether to permit access to the server 300 or not on the display unit 114 or may display a character string representing the URL 50 on the display unit 114.

(Variant 8) The "function executing unit" is not limited to the MFP 10, and may be a a printer, a scanner and terminal device such as a PC, or the like.

(Variant 9) In the embodiments above, the processes of FIGS. 3 to 5 are implemented by software (e.g., the programs 36, 336), however, at least one of these processes may be implemented by hardware such as a logic circuit.

What is claimed is:

1. A function executing device comprising:
   a first output unit; and
   a controller configured to:
   in a case where a specific instruction for causing the function executing device to execute a specific function is accepted from a target user, cause the first output unit to output first output information including location information of a server that is configured to operate according to a predetermined authentication scheme using a pair of keys and send a token creation request including device identification information for identifying the function executing device to the server,
   wherein the first output information is acquired by a terminal device configured to operate according to the predetermined authentication scheme, the terminal device is configured to:
  access the server by sending the location information and a token included in the first output information, acquired by the terminal device, to the server,
  receive first verification information from the server in response to accessing the server using the location information included in the first output information acquired by the terminal device;
  in a case where first authentication for the target user executed by the terminal device succeeds, create signature information by encrypting the first verification information using a private key of the pair of keys; and
  send the signature information to the server,
the server is configured to:
  in a case where the signature information is received from the terminal device, decrypt the signature information using a public key of the pair of the keys; and
  in a case where the first verification information is acquired by decrypting the signature information, send an execution instruction for the specific function to the function executing device identified by the device identification information stored in association with the token received from the terminal device;
  in a case where the token creation request is received from the function executing device, create the token;
  store the device identification information included in the token creation request and the token in association with each other; and
  send the token to the function executing device,
wherein the first output information includes the location information and the token received from the server, and
in a case where the execution instruction is received from the server after the first output information has been outputted, execute the specific function.

2. The function executing device as in claim 1, wherein
the function executing device is configured to execute at least one function out of a print function and a scan function, and
the specific function is the at least one function.

3. The function executing device as in claim 1, wherein the predetermined authentication scheme is a Fast Identity Online (FIDO) authentication scheme.

4. The function executing device as in claim 1, wherein
the first output unit is a display unit, and
the first output information is a code image acquired by encoding the location information.

5. The function executing device as in claim 1, wherein
the first output information includes the location information and device identification information for identifying the function executing device,
the terminal device is configured to access the server by sending the location information and the device identification information included in the first output information, acquired by the terminal device, to the server, and
the server is configured to, in the case where the first verification information is acquired by decrypting the signature information, send the execution instruction to the function executing device identified by the device identification information received from the terminal device.

6. The function executing device as in claim 1, wherein
the server is configured to store, for each of one or more users, user identification information for identifying the user and a key for the user in association with each other,
the first output information includes the location information and target user identification information for identifying the target user,
the terminal device is configured to access the server by sending the location information and the target user identification information included in the first output information, acquired by the terminal device, to the server, and
the server is configured to, in the case where the signature information is received from the terminal device, decrypt the signature information using the public key which is a key stored in association with the target user identification information received from the terminal device.

7. The function executing device as in claim 1, wherein
the server is configured to store, for each of one or more users, user identification information for identifying the user and a key for the user in association with each other,
the controller is further configured to, in the case where the specific instruction is accepted from the target user, send a token creation request including target user identification information for identifying the target user to the server,
the server is configured to:
  in a case where the token creation request is received from the function executing device, create a token;
  store the target user identification information included in the token creation request and the created token in association with each other; and
  send the token to the function executing device,
the first output information includes the location information and the token received from the server,
the terminal device is configured to access the server by sending the location information and the token included in the first output information, acquired by the terminal device, to the server, and
the server is configured to, in the case where the signature information is received from the terminal device, specify the target user identification information stored in association with the token received from the terminal device and decrypt the signature information using the public key which is a key stored in association with the target user identification information.

8. The function executing device as in claim 1, further comprising:
a second output unit,
wherein the controller is further configured to, in a case where a registration instruction is accepted from the target user, cause the second output unit to output second output information including the location information,
the second output information is acquired by the terminal device,
the terminal device is configured to:
  in a case where the second output information is acquired, receive second verification information from the server in response to accessing the server using the location information included in the second output information;
  in a case where second authentication for the target user executed by the terminal device succeeds, create the pair of keys; and send the public key of the created pair of keys and the second verification information received from the server to the server, and the server is configured to, in a case where the public key and the second verification information are received from the terminal device, register the public key.

9. The function executing device as in claim 8, wherein the second output information includes the location information and device identification information for identifying the function executing device, the terminal device is configured to, in the case where the second output information is acquired, access the server by sending the location information and the device identification information included in the second output information to the server, and the server is configured to, in a case where the public key is registered, send a registration completion notification to the function executing device identified by the device identification information received from the terminal device.

10. The function executing device as in claim 8, wherein the second output information includes the location information and target user identification information for identifying the target user, the terminal device is configured to, in the case where the second output information is acquired, access the server by sending the location information and the target user identification information included in the second output information to the server, and the server is configured to, in the case where the public key and the second verification information are received from the terminal device, register the target user identification information received from the terminal device and the public key in association with each other.

11. The function executing device as in claim 8, wherein the second output unit is a communication interface, in a case where the registration instruction is accepted by the terminal device accessing a web server of the function executing device via the communication interface, the controller is configured to send the second output information to the terminal device via the communication interface, and the second output information is a redirect instruction including the location information.

12. A server configured to operate according to a predetermined authentication scheme using a pair of keys, the server comprising:

a controller configured to:

send first verification information to a terminal device, wherein the terminal device acquires first output information outputted from a function executing device and accesses the server by sending location information of the server and a token included in the first output information to the server, wherein the function executing device is configured to, in a case where a specific instruction for causing the function executing device to execute a specific function is accepted from a target user, output the first output information and send a token creation request including device identification information for identifying the function executing device to the server, and the terminal device is configured to:

in a case where first authentication for the target user executed by the terminal device succeeds after the first verification information has been received from the server, create signature information by encrypting the first verification information using a private key of the pair of keys; and send the signature information to the server;

receive the signature information from the terminal device;

in a case where the signature information is received from the terminal device, decrypt the signature information using a public key of the pair of the keys;

in a case where the first verification information is acquired by decrypting the signature information, send an execution instruction for the specific function to the function executing device identified by the device identification information stored in association with the token received from the terminal device;

in a case where the token creation request is received from the function executing device, create the token;

store the device identification information included in the token creation request and the token in association with each other; and send the token to the function executing device, wherein the first output information includes the location information and the token received from the server, and wherein the function executing device is configured to, in a case where the execution instruction is received from the server, execute the specific function.

13. A communication system comprising:

a function executing device; and a server configured to operate according to a predetermined authentication scheme using a pair of keys, wherein the function executing device comprises:

a first output unit; and a controller configured to, in a case where a specific instruction for causing the function executing device to execute a specific function is accepted from a target user, cause the first output unit to output first output information including location information of the server and send a token creation request including device identification information for identifying the function executing device to the server, wherein the first output information is acquired by a terminal device configured to operate according to the predetermined authentication scheme, wherein the server comprises:

a controller configured to:

send first verification information to the terminal device, wherein the terminal device is configured to:

access the server by sending the location information and a token included in the first output information, acquired by the terminal device, to the server, in a case where first authentication for the target user executed by the terminal device succeeds after the first verification information has been received from the server, create signature information by encrypting the first verification information using a private key of the pair of keys; and send the signature information to the server, receive the signature information from the terminal device;

in a case where the signature information is received from the terminal device, decrypt the signature information using a public key of the pair of the keys;

in a case where the first verification information is acquired by decrypting the signature information, send an execution instruction for the specific function to the function executing device identified by the device identification information stored in association with the token received from the terminal device,
store the device identification information included in the token creation request and the token in association with each other; and
send the token to the function executing device,
the controller of the function executing device is further configured to:
in a case where the execution instruction is received from the server after the first output information has been outputted, execute the specific function.

* * * * *